US012718252B2

(12) United States Patent
Appel et al.

(10) Patent No.: US 12,718,252 B2
(45) Date of Patent: Aug. 25, 2026

(54) AUTOMATED COMPLAINT MANAGEMENT AND RESOLUTION

(71) Applicant: International Business Machines Corporation, Armonk, NY (US)

(72) Inventors: Ana Paula Appel, São Paulo (BR); Diego Brito Veiga, Campinas (BR); Paulo Rodrigo Cavalin, Rio de Janeiro (BR); Andre Felipe P Lopes, Jacarei (BR); Jorge Damiao Barbosa das Chagas, Sao Jose dos Campos (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/919,032

(22) Filed: Oct. 17, 2024

(65) Prior Publication Data

US 2026/0111904 A1 Apr. 23, 2026

(51) Int. Cl.
*G06Q 30/015* (2023.01)
*G06F 16/34* (2019.01)
(Continued)

(52) U.S. Cl.
CPC ......... *G06Q 30/015* (2023.01); *G06F 16/345* (2019.01); *G06F 40/295* (2020.01); *G06F 40/30* (2020.01)

(58) Field of Classification Search
CPC . G06Q 30/015; G06Q 30/016; G06Q 30/0282
See application file for complete search history.

(56) References Cited

U.S. PATENT DOCUMENTS 10,346,621 B2 7/2019 Athulurutlrumala
10,467,541 B2 11/2019 Podgorny
(Continued)

FOREIGN PATENT DOCUMENTS

CN 113204627 B 8/2022

OTHER PUBLICATIONS

Sun, Shuoshuo, et al. "Customer Complaint Guided Fault Localization Based on Domain Knowledge Graph." International Conference on Database Systems for Advanced Applications. Cham: Springer Nature Switzerland, 2023. (Year: 2023).*
(Continued)

*Primary Examiner* — Emmett K. Walsh
(74) *Attorney, Agent, or Firm* — Amin, Turocy & Watson, LLP

(57) ABSTRACT

A system includes a processor that executes computer executable components stored in a memory. The computer executable components include an identification component that identifies a user associated with a complaint and queries a database for historical data pertaining to the user. The computer executable components further include an analysis component that analyzes the complaint. The computer executable components also include an issue component that determines an issue from the user complaint, based at least in part on the analysis. The computer executable components further include a mapping component that identifies, based on the determined issue, one or more similar complaints from the historical user data, and extracts an inference context from a knowledge graph. The computer executable components also include a resolution component that generates a solution to the determined issue.

20 Claims, 8 Drawing Sheets

(51) Int. Cl.
*G06F 40/295* (2020.01)
*G06F 40/30* (2020.01)

(56) References Cited

U.S. PATENT DOCUMENTS

| | | | | |
|---|---|---|---|---|
| 11,249,730 | B2 | 2/2022 | Bodin | |
| 11,580,131 | B2 | 2/2023 | Ivanov | |
| 11,748,555 | B2 | 9/2023 | Tran | |
| 2020/0342462 | A1* | 10/2020 | Todd | G06N 5/04 |
| 2021/0081836 | A1 | 3/2021 | Polleri | |
| 2023/0045930 | A1 | 2/2023 | Can | |
| 2023/0154456 | A1 | 5/2023 | Bassani | |
| 2024/0031367 | A1 | 1/2024 | Pringle | |
| 2024/0177172 | A1 | 5/2024 | Ghoche | |
| 2024/0428003 | A1* | 12/2024 | Kakodkar | G06Q 30/016 |

OTHER PUBLICATIONS

Pan, et al. Unifying Large Language Models and Knowledge Graphs: A Roadmap.
Brate, et al. Improving Language Model Predictions via Prompts Enriched with Knowledge Graphs.
Izadi, et al., "Error Correction and Adaptation in Conversational AI: A Review of Techniques and Applications in Chatbots", Jun. 4, 2024, DOI 10.3390/ai5020041.

* cited by examiner

800

COMPUTER 801
PROCESSOR SET 810
PROCESSING CIRCUITRY 820
CACHE 821
COMMUNICATION FABRIC 811
VOLATILE MEMORY 812
PERSISTENT STORAGE 813
OPERATING SYSTEM 822
AUTOMATED COMPLAINT RESOLUTION CODE 880
PERIPHERAL DEVICE SET 814
UI DEVICE SET 823
STORAGE 824
IoT SENSOR SET 825
NETWORK MODULE 815
WAN 802
END USER DEVICE 803
REMOTE SERVER 804
REMOTE DATABASE 830
PRIVATE CLOUD 806
GATEWAY 840
PUBLIC CLOUD 805
CLOUD ORCHESTRATION MODULE 841
HOST PHYSICAL MACHINE SET 842
VIRTUAL MACHINE SET 843
CONTAINER SET 844

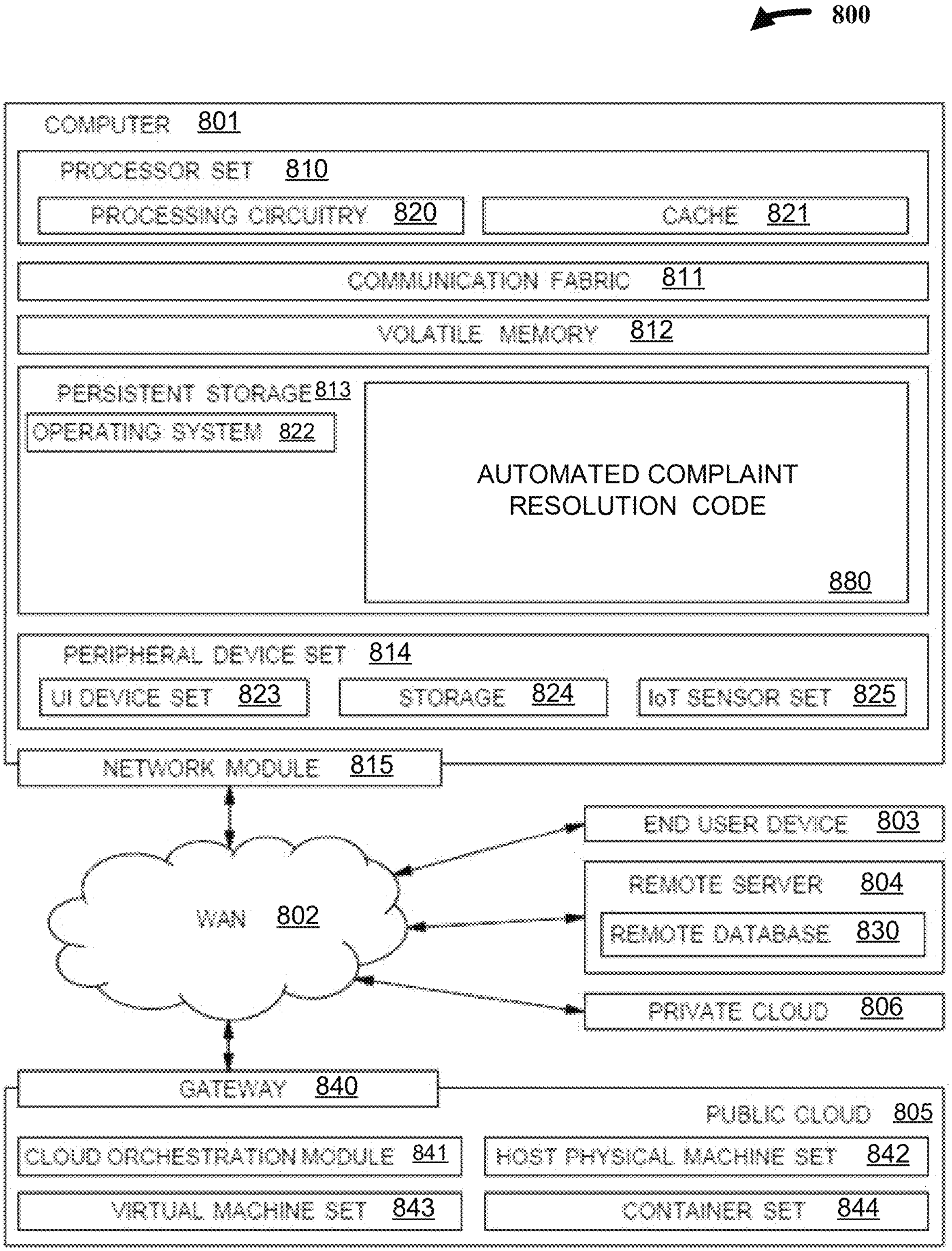

FIG. 8

AUTOMATED COMPLAINT MANAGEMENT AND RESOLUTION

TECHNICAL FIELD

The subject disclosure relates to complaint resolution, e.g., automated management and resolution of user complaints and/or disputes.

BACKGROUND

Businesses regularly handle a significant volume of complaints and inquiries from customers. These complaints can be received via numerous channels, such as phone calls, emails, and online chats, and typically concern dissatisfaction with products or services. When customer service representatives or managers address these issues, they often promise remedial actions, such as discounts, refunds, or adjustments to services. However, issues can arise when these promises are not promptly or accurately recorded in the appropriate systems following the interaction. When such commitments are not properly logged, they are easily forgotten or neglected. Such oversights not only lead to greater customer dissatisfaction but can also result in regulatory consequences. Moreover, if the system fails to capture these actions accurately, the customer is likely to return with additional complaints. There are also risks involved when incorrect or unauthorized actions are recorded. For example, compensations or discounts cannot be permissible for certain users based on their account type or regulatory restrictions. Offering such unauthorized benefits can result in financial losses and legal or regulatory penalties. Addressing these challenges is crucial to improving customer experience, ensuring compliance with regulatory requirements, and preventing fines and reputational damage for businesses, particularly financial institutions. A dynamic system is needed, one that can ensure all promised actions are accurately logged, verified, and enforced while also preventing unauthorized or incorrect actions from being taken.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate automated management of user complaints and dispute resolution are provided.

According to an embodiment, a system can comprise a processor that executes computer executable components stored in memory. The computer executable components can comprise an identification component that identifies a user associated with a complaint and queries a database for historical data pertaining to the user. The computer executable components can further include an analysis component that analyzes the complaint. The computer executable components can also include an issue component that determines an issue from the user complaint, based at least in part on the analysis. The computer executable components can further include a mapping component that identifies, based on the determined issue, one or more similar complaints from the historical user data, and extracts an inference context from a knowledge graph. The computer executable components can also include a resolution component that generates a solution to the determined issue.

According to another embodiment, a computer-implemented method can comprise receiving a user complaint. The computer-implemented method can further comprise identifying the user and querying a database for historical data pertaining to the user, analyzing the complaint, and determining an issue from the user complaint. The computer-implemented method can further comprise identifying, based on the determined issue, one or more similar complaints from the historical user data, and extracting an inference context from a knowledge graph. The computer-implemented method can further comprise generating a solution to the determined issue.

According to another embodiment, a computer program product comprising a computer readable storage medium having program instructions embodied therewith, the program instructions executable by a processor to cause the processor to receive, by the processor, a user complaint. The program instructions can also cause the processor to identify, by the processor, the user and query a database for historical data pertaining to the user. The program instructions can also cause the processor to analyze the complaint and to determine an issue from the user complaint. The program instructions can also cause the processor to identify, based on the determined issue, one or more similar complaints from the historical user data. The program instructions can also cause the processor to extract, by the processor, an inference context from a knowledge graph, and to generate, by the processor, a solution to the determined issue.

BRIEF DESCRIPTION OF THE DRAWINGS

FIG. 8 illustrates a block diagram of an example computing environment in which some embodiments described herein can be facilitated.

DETAILED DESCRIPTION

Figure 1:
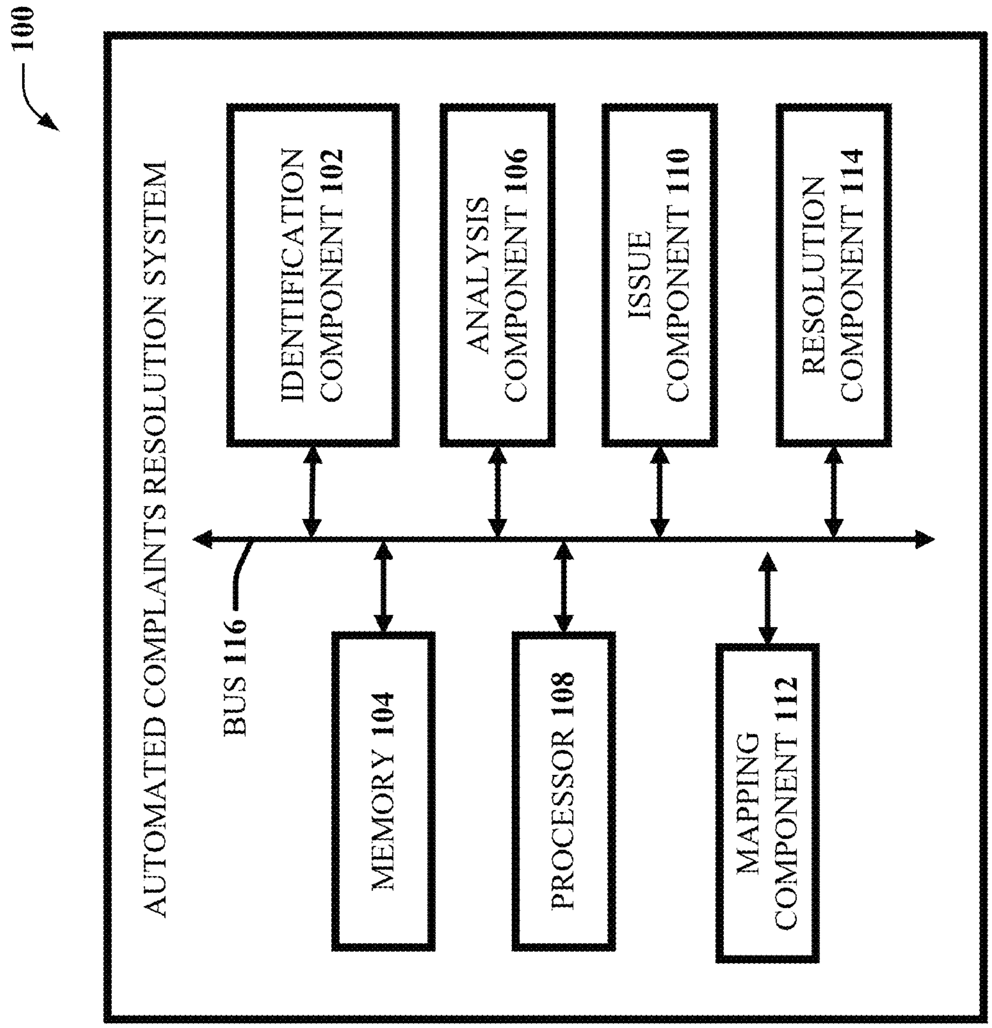
FIGS. 1 and 2 illustrate example systems that can facilitate automated management of user complaints and dispute resolution in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

Businesses routinely manage a high volume of customer complaints and inquiries through various communication channels, such as phone calls, emails, live chats, and social media platforms. These interactions typically involve addressing dissatisfaction with products or services, ranging from minor service disruptions to more serious issues like incorrect billing, poor service experiences, or product defects.

In many instances, resolving these complaints requires offering the customer some form of compensation. These compensatory actions can include discounts, refunds, service upgrades, or special offers aimed at retaining the customer and maintaining a positive relationship. However, while these promises of compensation or remedial action are made during customer interactions, the actual implementation of these solutions often hinges on the proper logging and tracking of the committed actions within the company's systems. One of the critical challenges businesses face is ensuring that these promised actions are recorded in real time and accurately reflected in their internal databases or customer relationship management platforms.

When these commitments are not promptly or correctly logged, they can be easily forgotten or mismanaged, leading to consequences. Customers assured of a resolution expect the issue to be fixed and, if not addressed in a timely manner, are likely to return with further complaints, escalating the situation and increasing frustration. Failure to effectively manage customer complaints and inquiries can lead to severe consequences for businesses, particularly in industries that are tightly regulated, such as banking, insurance, and telecommunications. In such sectors, unresolved complaints often lead to formal disputes, where customers escalate their grievances to external regulatory bodies. Regulatory complaints can only result in fines and penalties, but they can also harm a company's reputation, leading to a loss of customer trust and potential legal liabilities. Additionally, regulated industries have strict compliance requirements, and failure to track and execute promised actions can result in non-compliance, subjecting a company to further regulatory scrutiny and financial penalties.

There is also a risk associated with incorrect or unauthorized actions being recorded and carried out. For example, offering unauthorized compensation can lead to financial losses, especially if the error is replicated at scale. In some cases, this can also trigger regulatory compliance issues, as certain benefits can violate industry rules or corporate policies when provided to ineligible customers.

To mitigate these challenges, businesses need to implement dynamic, integrated systems that ensure all customer service interactions and promises of remedial actions are accurately logged, verified, and tracked.

In relation to automated complaint management and resolution, embodiments of the present disclosure produce a solution to one or more of these problems. Described herein are systems, methods, and computer-program products that can facilitate user issue determination and solution generation. More particularly, the invention disclosed herein can dynamically solve a user problem regarding a product or service and produce a solution to a received user complaint or inquiry based on the past user interactions. The invention utilizes a combination of large language models ("LLMs") and knowledge graphs ("KGs") in order to prevent hallucinations and ensure that business rules and regulations are obeyed. The system described herein can convert a received customer complaint or inquiry to text, which is then used as input for the analysis. The system can query historical data pertaining to that customer, including transactional data and profile information. A separate database can be used to retrieve a structured form of the customer's previous interactions. The system can utilize a Foundation Model to generate a live summary context regarding the customer, customizing the prompt with past user information. As used herein, the term "Foundation Model" can refer to a large, pre-trained neural network that serves as a versatile base for downstream tasks. These models can be trained on vast amounts of data and can adapt to various applications through transfer learning. A primary feature of a foundation model is its general-purpose nature, achieved by pre-training on diverse and large-scale datasets. This pre-training can capture patterns, relationships, and semantics across a wide range of contexts. Once trained, Foundation Models can be fine-tuned or used directly for specific tasks, such as text classification. Thus, by leveraging a Foundation Model, the system can enhance context for each user individually. More particularly, the system can leverage Foundation Models fine-tuned to perform Named Entities Recognition from the transcribed conversation in order to accurately determine the user problem, the content of the complaint, and other features of the input. The system can gather historical data and analyze the tone of the conversation and semantic structure from transcribed texts in order to monitor the conversation flow in order to detect potential churn. The system can generate answers to the client using LLMs and KGs in order to try to resolve the problem while avoiding hallucinations. The system can continually consult databases in order to guarantee guardrails are properly addressed. Once the problem is identified, the system can enhance the inference context with the Knowledge Graph, and generate potential solutions or actions tailored to the identified problem and the customer's profile. The system can then generate an output as a set of actions or responses suitable for the customer's complaint.

The embodiments described herein can solve such problems by receiving a user complaint, identifying the user, and querying a database for historical data pertaining to the user, analyzing the complaint, and determining an issue from the user complaint. These embodiments can also comprise identifying, based on the determined issue, one or more similar complaints from the historical user data, and extracting an inference context from a knowledge graph. These embodiments can further include generating a solution to the determined issue.

According to an embodiment, a system can comprise a processor that executes computer executable components stored in memory. The computer executable components can comprise an identification component that identifies a user associated with a complaint and queries a database for historical data pertaining to the user. The computer executable components can further include an analysis component that analyzes the complaint. The computer executable components can also include an issue component that determines an issue from the user complaint, based at least in part on the analysis. The computer executable components can further include a mapping component that identifies, based on the determined issue, one or more similar complaints from the historical user data, and extracts an inference context from a knowledge graph. The computer executable components can also include a resolution component that generates a solution to the determined issue.

In some embodiments, the analysis comprises at least one of natural language analysis, named entity recognition, or tone analysis. The analysis component can utilize a foundation model to summarize the user complaint and user data. The analysis component can further generate a live summary of the user complaint context, based upon the analyses performed and the summarized user complaint and user data. In some embodiments, the determined issue is associated with the user live summary. The solution generated by the resolution component can further be tailored to the determined issue associated with the user live summary. According to some embodiments, the analysis component identifies at least one of: a problem associated with the complaint, a content of the complaint, a main point of the complaint, a reason for the complaint, positive and negative points of the complaint, or a legal risk involved with the complaint.

According to some embodiments, the generated solution is based at least in part on the historical data. The historical data can comprise at least one of: transactional and profile information associate with the customer, or structured form of the customer's previous interactions.

The system can further comprise a response component that generates a response and transmits the response to the user.

In some embodiments, the system further comprises an artificial intelligence component that builds a generative artificial intelligence model to facilitate user issue determination and solution generation.

Advantages of this system can include improved customer satisfaction, prevention of repeated complaints, enhanced regulatory compliance, minimized risk of unauthorized actions, enhanced operational efficiency, reduced legal and financial risk, greater scalability and flexibility, proactive issue management and data-driven insights.

According to some embodiments, the above-described computer system can be implemented as a computer-implemented method or as a computer program product.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments can be practiced without these specific details, yet a person having ordinary skill in the art will recognize that such embodiments are within metes and bounds of this disclosure.

FIG. 1 illustrates an example system 100 for facilitating automated user issue determination and solution generation. The system 100 uses an identification component, an analysis component, an issue component, a mapping component, and a resolution component. The identification component identifies a user associated with a complaint and queries a database for historical data pertaining to the user. The analysis component analyzes the complaint. The issue component determines an issue from the user complaint, based at least in part on the analysis. The mapping component that identifies, based on the determined issue, one or more similar complaints from the historical user data, and extracts an inference context from a knowledge graph. The resolution component generates a solution to the determined issue.

Aspects of systems (e.g., systems 100, 200, and the like), apparatuses, or processes in various embodiments of the present disclosure can constitute one or more machine-executable components embodied within one or more machines. For example, the components can be embodied in one or more computer readable mediums (or media) associated with one or more machines. Such components, when executed by the one or more machines (e.g., computers, computing devices, virtual machines, etc.) can cause the machines to perform the operations described. System 100 can comprise an identification component 102, a memory 104, an analysis component 106, a processor 108, an issue component 110, a mapping component 112, and a resolution component 114.

The system 100 and/or the components of the system 100 can use hardware and/or software to solve problems that are highly technical in nature. The system 100 solves problems that are not abstract and that cannot be performed as a set of mental acts by a human. Further, some of the processes can be performed by specialized computers for carrying out defined tasks related to automated user issue determination and solution generation. The system 100 and/or components of the system 100 can be employed to solve new problems that arise through advancements in technologies. The system 100 can provide technical improvements to automated user issue determination and solution generation by improving customer satisfaction, preventing repeated complaints, enhancing regulatory compliance, minimizing risk of unauthorized actions, enhancing operational efficiency, and reducing legal and financial risk.

The system 100 can include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that can be operably connected to the processor 108. The memory 104 can store computer-executable instructions that, upon execution by the processor 108, can cause the processor 108 and/or one or more other components of the system 100 (e.g., application identification component 102, the analysis component 106, the issue component 110, the mapping component 112, and/or the resolution component 114) to perform one or more actions. In some embodiments, the memory 104 can store computer-executable components (e.g., application identification component 102, the analysis component 106, the issue component 110, the mapping component 112, and/or the resolution component 114).

The system 100 and/or a component thereof as described herein can be communicatively, electrically, operatively, optically, and/or otherwise coupled to one another via a bus 116. The bus 116 can include one or more of a memory bus, memory controller, peripheral bus, external bus, local bus, and/or another type of bus that can employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In various embodiments, the identification component 102 identifies a user associated with a complaint and queries a database for historical data pertaining to the user.

The analysis component 106 can analyze the complaint. In some embodiments, the analysis comprises at least one of natural language analysis, named entity recognition, or tone analysis. The analysis component 106 can utilize a foundation model to summarize the user complaint and user data. In various embodiments, analysis component 106 can further generate a live summary of the user complaint context, based upon the analyses performed and the summarized user complaint and user data. In some embodiments, analysis component 106 identifies at least one of: a problem associated with the complaint, a content of the complaint, a main point of the complaint, a reason for the complaint, positive and negative points of the complaint, or a legal risk involved with the complaint.

Issue component 110 can determine an issue from the user complaint, based at least in part on the analysis. The determined issue can be associated with the user live summary.

The mapping component 112 can identify, based on the determined issue, one or more similar complaints from the historical user data, and extracts an inference context from a knowledge graph.

Resolution component 114 can generate a solution to the determined issue. According to some embodiments, the generated solution can be based at least in part on the historical data. The historical data can comprise at least one of: transactional and profile information associate with the customer, or structured form of the customer's previous interactions. In some embodiments, the solution generated by the resolution component 114 is tailored to the determined issue associated with the user live summary.

Figure 2:
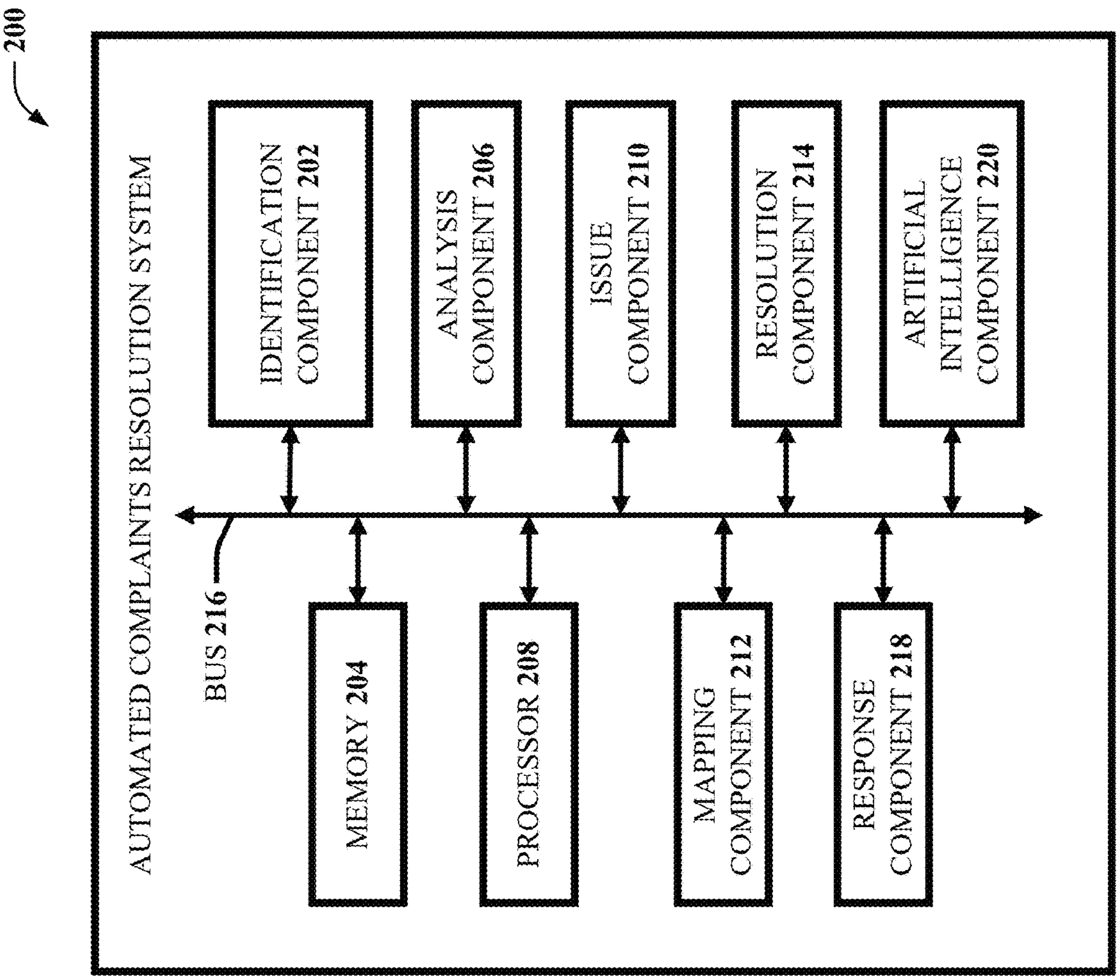

FIG. 2 illustrates an example system 200 that can facilitate automated user issue determination and solution generation. The system 200 uses an identification component, an analysis component, an issue component, a mapping component, a resolution component, a response component, and an artificial intelligence component. The system 200 can also include a memory 204, a processor 208, and a system bus 216. Description of like components has been omitted for the sake of brevity.

In various embodiments, the response component 218 generates a response and transmits the response to the user. The response can comprise a solution to the received user complaint.

In various embodiments, the artificial intelligence component 220 builds a generative artificial intelligence model to facilitate user issue determination and solution generation.

The systems and/or devices are described herein with respect to interaction between one or more components. Such systems and/or components can include the components and/or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity but known by those of skill in the art.

Figure 3:
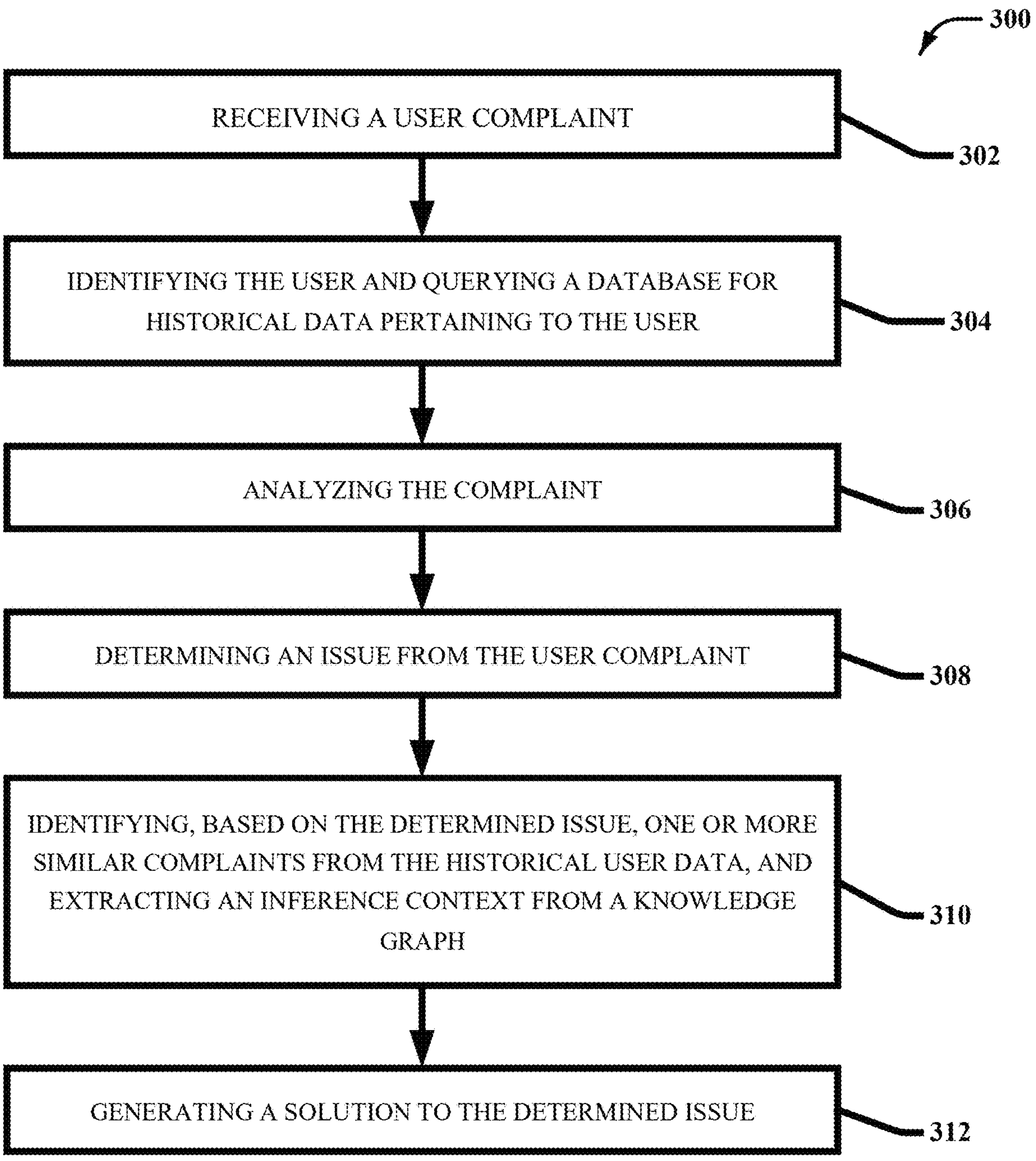
FIGS. 3 and 4 illustrate example computer implemented methods for automated complaint management and resolution in accordance with some embodiments described herein.

FIG. 3 illustrates a flow diagram of a method 300 that can facilitate automated complaint management and resolution in accordance with some embodiments described herein, such as the system 200 of FIG. 2 and the system 100 of FIG. 1. While the method 300 is described relative to the system 200 of FIG. 2, the method 300 can be applicable also to other systems described herein. Repetitive description of like elements and/or processes employed in respective embodiments is omitted for sake of brevity. In some embodiments, the method 300 is performed by a system such as system 100 of FIG. 1 or system 200 of FIG. 2.

At 302, the method 300 includes receiving a user complaint. The method 300 can use a system operatively coupled to the processor (e.g., identification component 202) to receive the user complaint.

At 304, the method 300 includes identifying the user and querying a database for historical data pertaining to the user. The method 300 can use a system operatively coupled to the processor (e.g., identification component 202) to identify the user and query the database for historical data pertaining to the user.

At 306, the method 300 includes analyzing the complaint. The method 300 can use a system operatively coupled to the processor (e.g., analysis component 206) to analyze the complaint.

At 308, the method 300 includes determining an issue from the user complaint. The method 300 can use a system operatively coupled to the processor (e.g., issue component 210) to determine the issue.

At 310, the method 300 includes identifying, based on the determined issue, one or more similar complaints from the historical user data, and extracting an inference context from a knowledge graph. A system (e.g., mapping component 212) can perform the identification and extraction.

At 312, the method 300 includes generation a solution to the determined issue. A system (e.g., resolution component 214) can generate the solution.

Figure 4:
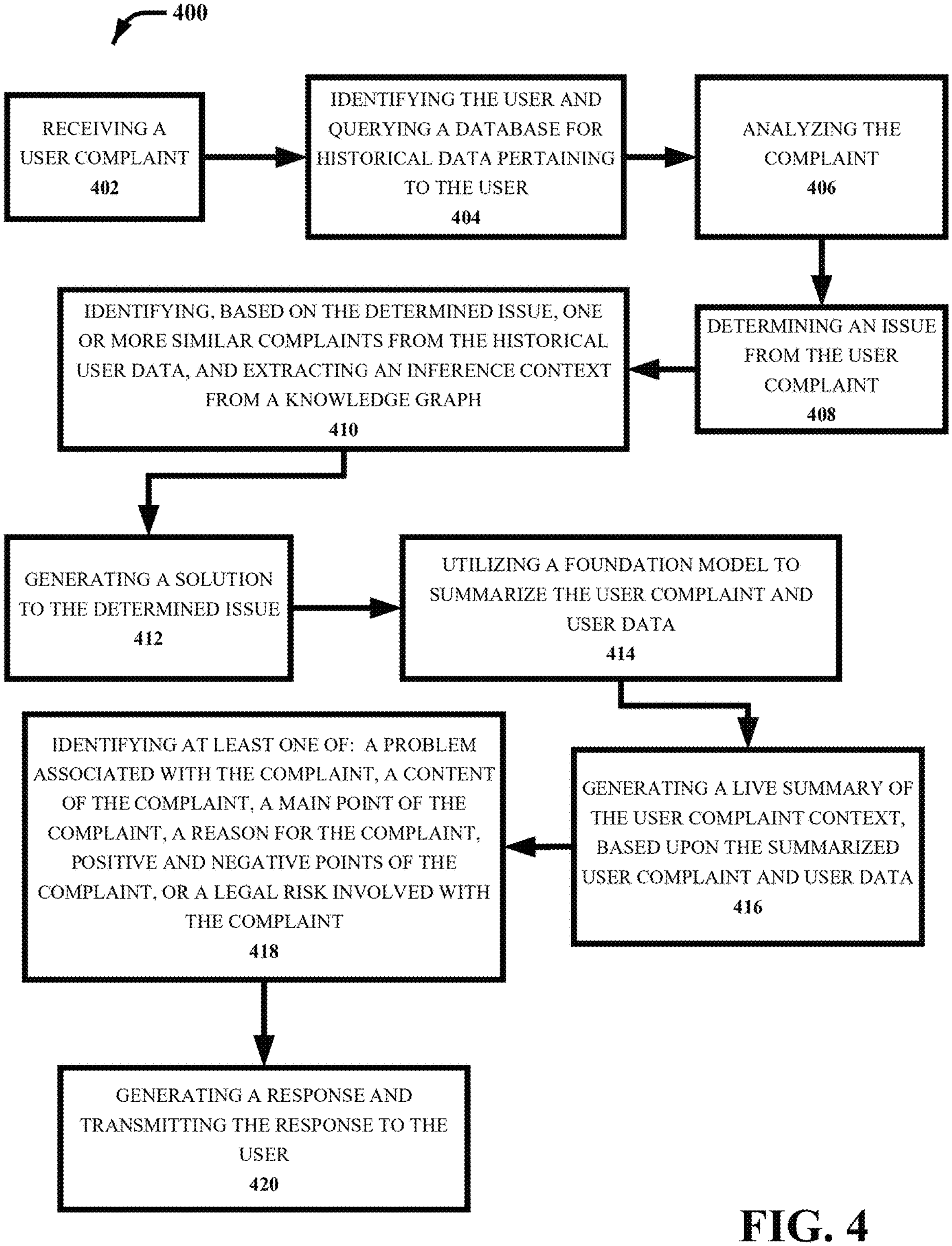

Next, FIG. 4 illustrates a flow diagram of a method 400 that can facilitate automated complaint management and resolution in accordance with some embodiments described herein. While the method 400 is described relative to the system 200 of FIG. 2, the method 400 can be applicable also to other systems described herein such as the system 100 of FIG. 1.

For simplicity of explanation, the computer-implemented methods provided herein are depicted and/or described as a series of actions. It is to be understood that the subject matter is not limited by the actions illustrated and/or by the order thereof. For example, actions can occur in one or more orders, concurrently, and/or with other acts not presented and described herein. Furthermore, not all illustrated actions can be utilized to implement the computer-implemented methods in accordance with the described subject matter. In addition, the computer-implemented methods could alternatively be represented as a series of interrelated states via a state diagram or events. Additionally, the computer-implemented methods described in this specification are capable of being stored on an article of manufacture to facilitate transporting and transferring the computer-implemented methods to computers. The term article of manufacture, as used herein, encompasses a computer program accessible from any computer-readable device or storage media.

At 402, the method 400 includes receiving a user complaint. The method 400 can use a system operatively coupled to the processor (e.g., identification component 202) to receive the user complaint.

At 404, the method 400 includes identifying the user and querying a database for historical data pertaining to the user. The method 400 can use a system operatively coupled to the processor (e.g., identification component 202) to identify the user and query the database for historical data pertaining to the user.

At 406, the method 400 includes analyzing the complaint. The method 400 can use a system operatively coupled to the processor (e.g., analysis component 206) to analyze the complaint.

At 408, the method 400 includes determining an issue from the user complaint. The method 400 can use a system operatively coupled to the processor (e.g., issue component 210) to determine the issue.

At 410, the method 400 includes identifying, based on the determined issue, one or more similar complaints from the historical user data, and extracting an inference context from a knowledge graph. A system (e.g., mapping component 212) can perform the identification and extraction.

At 412, the method 400 includes generation a solution to the determined issue. A system (e.g., resolution component 214) can generate the solution.

At 414, the method 400 includes utilizing a foundation model to summarize the user complaint and user data. A system (e.g., analysis component 206 or artificial intelligence component 220) can utilize the foundation model to summarize the user complaint and user data.

At 416, the method 400 includes generating a live summary of the user complaint context, based upon the summarized user complaint and user data. A system (e.g., analysis component 206, issue component 210, or artificial intelligence component 220) can generate the live summary of the user complaint context.

At 418, the method 400 includes identifying at least one of: a problem associated with the complaint, a content of the complaint, a main point of the complaint, a reason for the complaint, positive and negative points of the complaint, or a legal risk involved with the complaint. A system (e.g., analysis component 206, issue component 210, or artificial intelligence component 220) can perform the identification.

At 420, the method 400 includes generating a response and transmitting the response to the user. A system (e.g., response component 218, or artificial intelligence component 220) can generate the response and transmit the response to the user.

One or more systems, devices, computer program products, and/or computer-implemented methods provided herein relate to automated complaint management and resolution. A system can include a processor that executes computer executable components stored in memory. The computer executable components can include an identification component that identifies a user associated with a complaint and queries a database for historical data pertaining to the user. The computer executable components can further include an analysis component that analyzes the complaint. The computer executable components can also include an issue component that determines an issue from the user complaint, based at least in part on the analysis. The computer executable components can further include a mapping component that identifies, based on the determined issue, one or more similar complaints from the historical user data, and extracts an inference context from a knowledge graph. The computer executable components can also include a resolution component that generates a solution to the determined issue.

Advantages of this system include improved customer satisfaction, prevention of repeated complaints, enhanced regulatory compliance, minimized risk of unauthorized actions, enhanced operational efficiency, reduced legal and financial risk, greater scalability and flexibility, proactive issue management and data-driven insights.

In some embodiments of the aforementioned system, the analyzing comprises performing at least one of natural language analysis, named entity recognition, or tone analysis on the received user complaint.

In some embodiments of the aforementioned system, the generated solution is based at least in part on the historical data. The historical further data can comprise at least one of: transactional and profile information associated with the customer, or structured form of the customer's previous interactions.

In some embodiments of the aforementioned system, the system utilizes a foundation model to summarize the user complaint and user data. The system can further generate a live summary of the user complaint context, based upon the summarized user complaint and user data.

In some embodiments of the aforementioned system, the system identifies at least one of: a problem associated with the complaint, a content of the complaint, a main point of the complaint, a reason for the complaint, positive and negative points of the complaint, or a legal risk involved with the complaint.

In some embodiments of the aforementioned system, the system generates a response and transmitting the response to the user.

Figure 5:
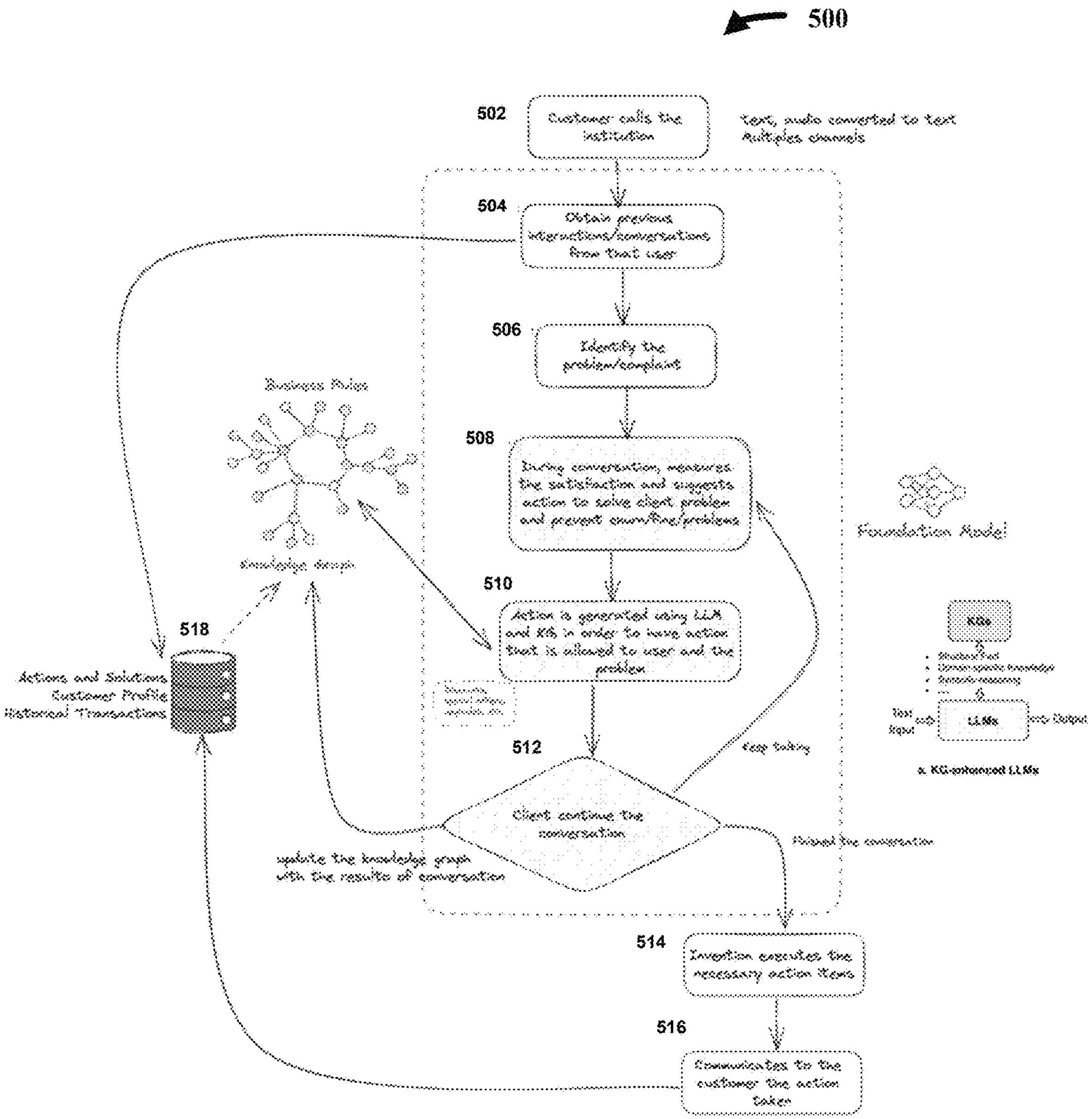
FIG. 5-7 illustrate example method flow diagrams that facilitates automated complaint management and resolution in accordance with some embodiments described herein.

FIG. 5 illustrates an example method flow diagram that can facilitate automated complaint management and resolution in accordance with some embodiments described herein.

At 502, the customer calls the institution to complain regarding something that is not correct or because the customer wants a correction to a consumer service or product. The system can convert the audio to text to serve as an input to the analyses.

At 504, the system queries the historical data from that customer. From one database it gathers transactional and profile information. Another database is used by the system in order to retrieve the structured form of the customer's previous interactions. A Foundation Model also generates a live summary of whole context regarding this specific customer, customizing the prompt with this past user information, and enhancing context for each user individually.

At 506, the system leverages Foundation Models fine-tuned to perform Named Entities Recognition from transcribed conversation in order to accurately determine the user problem and the content of the complaint, main points, such as reason of the complaint, positive and negative points, and, if there is explicit legal risk involved, allowing it to focus on what matters most to the product criteria.

At 508, the system gathers multiple historic data, and in real time analyzes the tone of the conversation and semantic structure from transcribed texts in order to monitor the conversation flow in order to detect potential churn.

At 510, the system generates answers to the client using LLM and KG in order to try to resolve the problem while avoiding hallucinations. The system keeps consulting the database to guarantee the guardrails are being addressed depending on the solutions' proposals. The key differentiator in this step is that once the problem is identified, the processing starts by enhancing the inference context with the Knowledge Graph, and the system generates potential solutions or actions tailored to the identified problem and the customer's profile. The output is a set of actions or responses suitable for the customer's complaint.

At 512, the system tracks the client answer to finish or continue the conversation with an agreed proposal solution.

At 514, the system executes the proposal solution agreed upon by the client.

At 516, the system generates a notification message confirming the action executed.

At 518, the system updates the Knowledge Base (KB) database with the historical tracking (e.g., conversation details, action executed, etc.).

Figure 6:
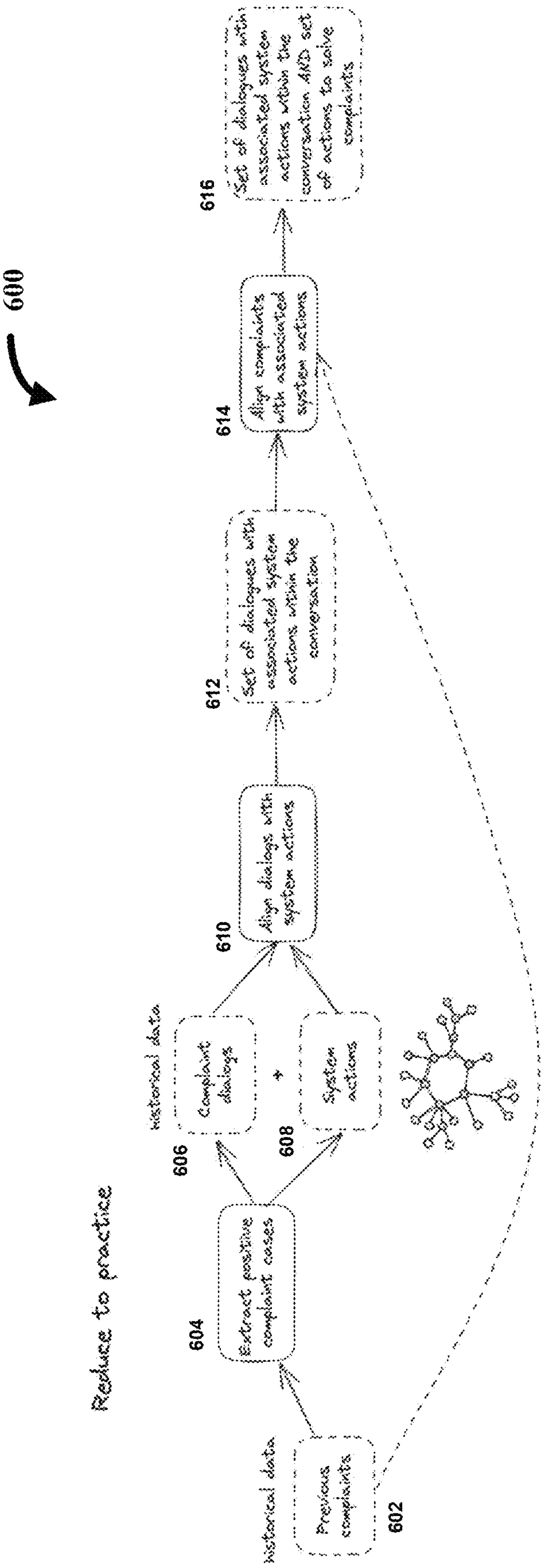

Next, FIG. 6 illustrates an example method flow diagram that can facilitate automated complaint management and resolution in accordance with some embodiments described herein.

At 602, a historical dataset of complaints is accessed. The historical data can include all interactions with clients, samples of interactions that ended up in complaints, and samples that were successful interaction cases with clients. Additionally, this dataset can include levels of client satisfaction (e.g., collected via a survey).

At 604, positive complaint cases are extracted. Datasets are created and trained with positive cases (e.g., complaints) and negative cases (e.g., no complaint, successful interaction with a client), with levels of satisfaction, or in any way that can be used to segment customers into different groups.

At 606, dataset containing the dialogs are associated with the samples in the historical dataset 602 (e.g., the sender and the timestamp associated to each message in the dialog). Actions can be associated with metadata (e.g., the person who performed the action and the timestamp of each action).

At 608, system actions are performed (e.g., database insertions and deletions, system point-and-click actions, etc.).

At 610, the system actions are aligned with the dialogue. This can be done using the information in DBs 604, 606 and 608. This module will, for instance, take each dialog and associate to each moment in the conversation an action was performed on the system.

At 612, the set of aligned conversations are generated by module 610. This dataset will contain dialogs with pointers from the conversation to actions performed in the system of the company.

At 614, using the information from 612, along with the training/test splits created with module 604, this module will separate the dataset in 612 and output a dataset of positive and negative dialogs with associated aligned actions.

At 616, the system generates a final dataset containing a training and a test dataset with positive samples, (e.g., complaints, and negative samples; successful interactions with the customer). Each sample in the dataset can be a pair of a dialog, containing a set of messages between a client and an attendant, and a set of system action performed by the attendant or by supporting staff, before, during, or after the conversation. This dataset can further be used to train a machine learning model or a generative AI model, for example, using end-to-end learning or by performing additional labeling or processing to extract relevant features of the dialog-to-system-actions pairing.

Figure 7:
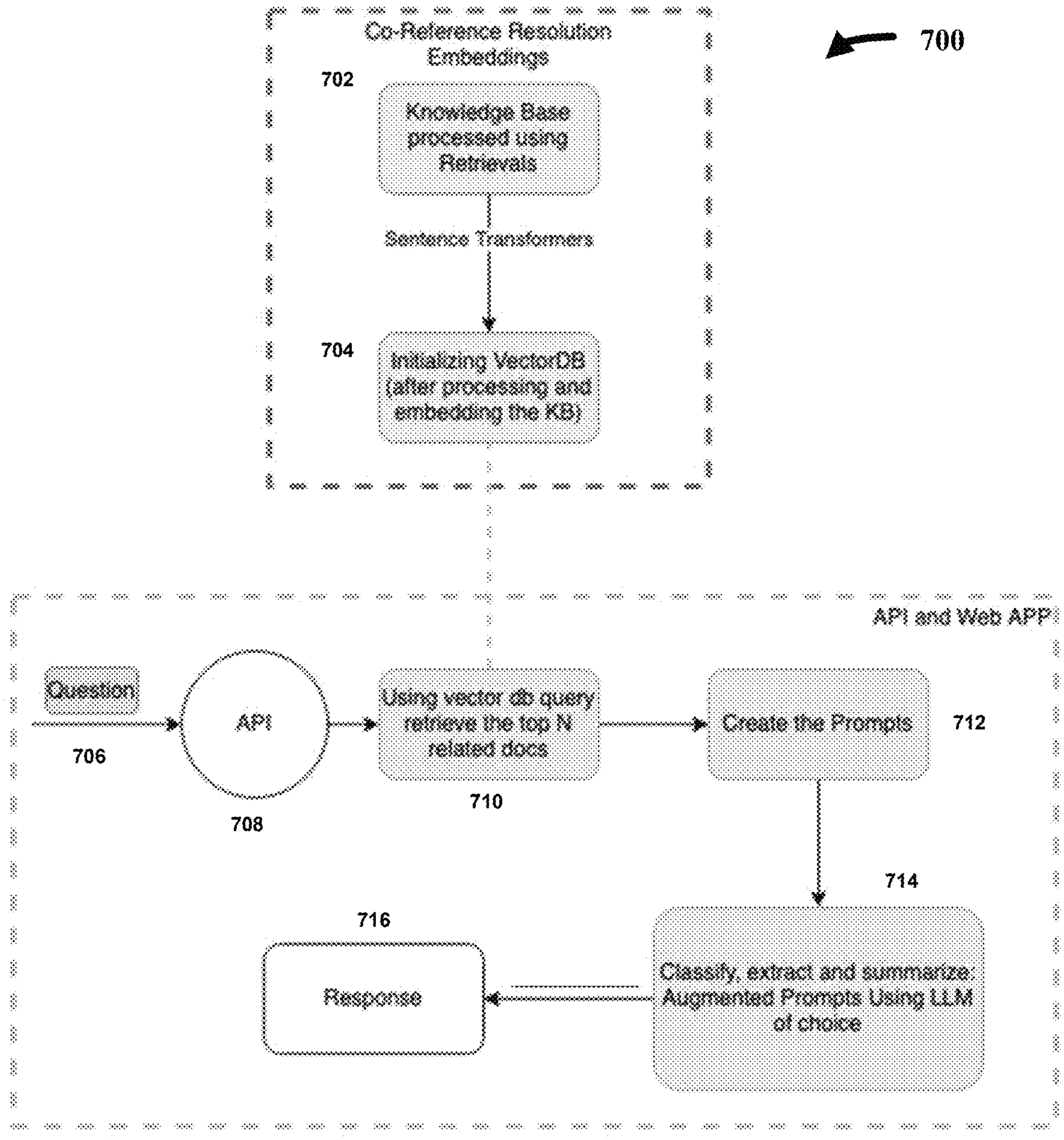

Next, FIG. 7 illustrates an example method flow diagram that can facilitate automated complaint management and resolution in accordance with some embodiments described herein. At 702, the system performs knowledge base processing using retrievals. At 704, the system, after processing and embedding the KB database, initializes a vector database. At 706, the system, receives a question from a user. At 708, the system outputs the question to an application programming interface ("API"). At 710, the system uses the vector database query to retrieve a top N related documents. At 712, the system creates the prompts. At 714, the system classifies, extracts, and summarizes augmented prompts using an LLM. At 716, the system generates a response to the user.

FIG. 8 and the following discussion are intended to provide a brief, general description of a suitable computing environment 800 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as iteratively updating the preliminary recovery plan until a failure-free recovery plan is developed with data protection workflow creation code 880. In addition to block 880, computing environment 800 includes, for example, computer 801, wide area network (WAN) 802, end user device (EUD) 803, remote server 804, public cloud 805, and private cloud 806. In this embodiment, computer 801 includes processor set 814 (including processing circuitry 820 and cache 821), communication fabric 811, volatile memory 812, persistent storage 813 (including operating system 822 and block 845, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method can be distributed among multiple computers and/or between multiple locations. On the other hand, in this presentation of computing environment 800, detailed discussion is focused on a single computer, specifically computer 801, to keep the presentation as simple as possible. Computer 801 can be located in a cloud, even though it is not shown in a cloud in FIG. 8. On the other hand, computer 801 is not required to be in a cloud except to any extent as can be affirmatively indicated.

PROCESSOR SET 810 includes one, or more, computer processors of any type now known or to be developed in the future. Processing circuitry 820 can be distributed over multiple packages, for example, multiple, coordinated integrated circuit chips. Processing circuitry 820 can implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set can be located "off chip." In some computing environments, processor set 810 can be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods can be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory can be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 can be a read only memory (ROM), but typically at least a portion of the persistent storage allows writing of data, deletion of data and re-writing of data. Some familiar forms of persistent storage include magnetic disks and solid-state storage devices. Operating system 822 can take several forms, such as various known proprietary operating systems or open-source Portable Operating System Interface type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 can include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 can be persistent and/or volatile. In some embodiments, storage 824 can take the form of a quantum computing storage device for storing data in the form of qubits. In embodiments where computer 801 is required to have a large amount of storage (for example, where computer 801 locally stores and manages a large database) then this storage can be provided by peripheral storage devices designed for storing large amounts of data, such as a storage area network (SAN) that is shared by multiple, geographically distributed computers. IT sensor set 825 is made up of sensors that can be used in Internet of Things applications. For example, one sensor can be a thermometer, and another sensor can be a motion detector.

NETWORK MODULE 815 is the collection of computer software, hardware, and firmware that allows computer 801 to communicate with other computers through WAN 802. Network module 815 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and can take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 can be a client device, such as thin client, heavy client, mainframe computer and/or desktop computer.

REMOTE SERVER 804 is any computer system that serves at least some data and/or functionality to computer 801. Remote server 804 can be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data can be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs can be stored as images and can be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware and firmware allowing public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and/or operation of possible implementations of systems, computer-implementable methods, and/or computer program products according to some embodiments described herein. In this regard, each block in the flowchart or block diagrams can represent a module, segment, and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components, and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches, and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a processor that executes computer executable components stored in memory, wherein the computer executable components comprise:

an identification component that identifies a user associated with a complaint, and queries a database for historical data pertaining to the user, including transactional data and profile information;

an analysis component that analyzes textual content of the complaint using a trained foundation model to generate a semantic representation of the complaint;

an issue component that determines an issue from the user complaint, based at least in part on the semantic representation generated by the foundation model;

a mapping component that, based on the determined issue:

identifies one or more similar complaints from the historical user data; and enhances an inference context with information retrieved from a knowledge graph that stores entities, relationships, and business rules and regulatory constraints associated with the determined issue, such that the inference context is constrained by the retrieved information; and a resolution component that generates, using a large language model, a solution tailored to the determined issue and the user's historical data, wherein the large language model is conditioned on the constrained inference context enhanced with the knowledge graph so as to prevent hallucinations and to ensure that the generated solution complies with the business rules and regulatory constraints represented in the knowledge graph.

2. The system of claim 1, wherein the analysis comprises at least one of natural language analysis, named entity recognition, or tone analysis.

3. The system of claim 1, wherein the historical data influences selection of constraints or entities included in the inference context.

4. The system of claim 1, wherein the historical data comprises at least one of: transactional and profile information associated with the user, or structured form of the user's previous interactions.

5. The system of claim 1, wherein the analysis component utilizes the trained foundation model to summarize the user complaint and user data to produce a machine-readable summary used in determining the issue.

6. The system of claim 5, wherein the analysis component generates a live summary of the user complaint context, based upon the semantic representation and the summarized user complaint and historical data.

7. The system of claim 6, wherein the determined issue is associated with the live summary of the user complaint context.

8. The system of claim 7, wherein the solution generated by the resolution component is tailored to the determined issue associated with the live summary of the user complaint context.

9. The system of claim 1, wherein the analysis component identifies, using the semantic representation, at least one of: a problem associated with the complaint, a content of the complaint, a main point of the complaint, a reason for the complaint, positive and negative points of the complaint, or a legal risk involved with the complaint.

10. The system of claim 1, further comprising a response component that generates a response based on the generated solution and transmits the response to the user.

11. The system of claim 1, further comprising an artificial intelligence component that builds a generative artificial intelligence model using training data derived from resolved complaints and knowledge-graph-constrained solutions to facilitate user issue determination and solution generation.

12. A computer-implemented method that utilizes a processor that executes computer executable components stored in memory to perform the following acts:

receiving a user complaint;

identifying the user associated with the complaint and querying a database for historical data pertaining to the user;

analyzing textual content of the complaint using a trained foundation model to generate a semantic representation of the complaint;

determining an issue from the user complaint based at least in part on the semantic representation generated by the trained foundation model;

identifying, based on the determined issue, one or more similar complaints from the historical user data;

enhancing an inference context with a knowledge graph that stores entities, relationships, and business rules and regulatory constraints associated with the determined issue, such that the inference context is constrained by information retrieved from the knowledge graph; and generating, using a large language model conditioned on the inference context and the historical data, a solution to the determined issue, wherein the generated solution is constrained by the business rules and regulatory constraints represented in the knowledge graph.

13. The method of claim 12, wherein the analyzing comprises performing at least one of natural language analysis, named entity recognition, or tone analysis on the received user complaint.

14. The method of claim 12, wherein the generated solution is based at least in part on the historical data used to condition the large language model.

15. The method of claim 12, wherein the historical data further comprises at least one of: transactional and profile information associated with the customer, or structured form of the customer's previous interactions.

16. The method of claim 12, further comprising utilizing the trained foundation model to summarize the user complaint and user data.

17. The method of claim 16, further comprising generating a live summary of the user complaint context, based upon the summarized user complaint and user data.

18. The method of claim 12, further comprising identifying, using the semantic representation, at least one of: a problem associated with the complaint, a content of the complaint, a main point of the complaint, a reason for the complaint, positive and negative points of the complaint, or a legal risk involved with the complaint.

19. The method of claim 12, further comprising generating a response based on the solution generated using the large language model and transmitting the response to the user.

20. A computer program product comprising a non-transitory computer readable storage medium having program instructions embodied therewith, the program instructions executable by a processor to cause the processor to:

receive a user complaint;

identify the user and query a database for historical data pertaining to the user;

analyze textual content of the complaint using a trained foundation model to generate a semantic representation of the complaint;

determine an issue from the user complaint based at least in part on the semantic representation generated by the trained foundation model;

identify, based on the determined issue, one or more similar complaints from the historical user data;

enhance an inference context with a knowledge graph that stores entities, relationships, and business rules and regulatory constraints associated with the determined issue, such that the inference context is constrained by information retrieved from the knowledge graph; and generate, using a large language model conditioned on the inference context and the historical data, a rule-compliant, verifiable solution to the determined issue, wherein the generated solution is constrained by the business rules and regulatory constraints represented in the knowledge graph.

* * * * *